United States Patent [19]
Herb

[11] 3,789,298
[45] Jan. 29, 1974

[54] BEAM SCANNER

[75] Inventor: Raymond G. Herb, Madison, Wis.

[73] Assignee: National Electrostatics Corp., Middleton, Wis.

[22] Filed: July 29, 1971

[21] Appl. No.: 167,253

[52] U.S. Cl. ............................... 324/71 EB, 324/72
[51] Int. Cl. ........................ G01n 27/00, G01r 31/02
[58] Field of Search ............... 324/71 EB, 71 R, 72; 250/49.5 E, 83.3 R, 83

[56] References Cited
UNITED STATES PATENTS
3,641,341  2/1972  Jamba ............................ 250/49.5 E OTHER PUBLICATIONS
Beam Scanner For Two Dim. Scanning... G. Hortig, Nuclear Instruments & Methods, 1964, pp. 355–356.

Primary Examiner—Rudolph V. Rolinec
Assistant Examiner—Ernest F. Karlsen
Attorney, Agent, or Firm—Marshall A. Burmeister; Francois N. Palmatier; John G. Hamby

[57] ABSTRACT

A beam scanning electrode is mounted on a rotor and is movable repeatedly across a beam of high energy particles when the rotor is rotated. The scanning electrode is mounted within a beam tube having a conductive wall to which the scanning electrode is electrically connected, as by a wiping contactor. The impingement of the beam upon the scanning electrode causes the emission of secondary electrons which are gathered by a collector electrode, spaced from the scanning electrode and insulated from the conductive wall. An output lead is connected to the collector electrode and is brought out of the tube by a feed-through insulator or the like. In a modified arrangement, the collector electrode comprises a material which scintillates or emits photons due to the impingement of the secondary electrons. The photons are then detected and measured by a photomultiplier or some other photoelectric device.

23 Claims, 5 Drawing Figures

INVENTOR
Raymond G. Herb
by Burmeister, Palmatier
and Hamby Attys

PATENTED JAN 29 1974

BEAM SCANNER

This invention relates to a new and improved beam scanner for measuring the characteristics of a beam of high energy particles in a high voltage accelerator or some other device in which such particles are focused into a narrow beam. The particles may be electrons, protons, deuterons, negative ions or the like. The beam scanner detects the location, size shape, current density and cross sectional energy distribution of the beam.

The beam scanner of the present invention utilizes the known principle of providing a scanning electrode which is mounted on a rotor and is arranged to move twice across the beam during each revolution of the rotor. The beam causes a flow of current to or from the electrode as it moves across the beam.

In the prior art, a sliding contactor has been employed to carry the current from the scanning electrode to an oscilloscope or some other display or measuring device. Such a beam scanner was disclosed by G. Hortig in his paper entitled "A Beam Scanner For Two Dimensional Scanning With One Rotating Wire", published in the journal *Nuclear Instruments and Methods*, Volume 30 (1964) pages 355 and 356. Other beam scanners of this type are disclosed in the U.S. Pat. to Rose U.S. Pat. No. 3,207,082, issued Sept. 21, 1965, and in the U.S. Pat. to Meyer et al. No. 3,268,812, issued Aug. 23, 1966. A beam scanner using a vibratory scanning electrode is disclosed in the U.S. Pat. to Davey No. 3,371,274, issued Feb. 27, 1968.

In working with a beam scanner of the type disclosed in the Hortig paper, identified above, trouble was experienced with the sliding contactor which was necessary to transmit the signals from the rotary scanning electrode to the stationary output lead. It was found that the sliding contact between the stationary contactor or brush and the rotary slip ring or other member on the scanning electrode produced so much electrical noise that the beam scanner was virtually useless.

The present invention overcomes the problem of noisy sliding contact members by utilizing the secondary electrons emitted by the scanning electrode when it is bombarded by the high energy particles in the beam. The secondary electrons are collected by a stationary collector electrode spaced away from the scanning electrode. The collector electrode may extend around the scanning electrode so as to collect the secondary electrons emitted in various directions from the scanning electrode. A positive biasing voltage may be applied to the collector electrode to attract the secondary electrons.

The collector electrode may be connected to an output lead or conductor which is brought out of the passage or tube along which the beam is traveling. A feedthrough insulator may be employed to bring out the output conductor so that it can then be readily connected to an oscilloscope or some other indicating or measuring device.

In a modified arrangement, the secondary electrons are employed to produce photons which are then detected and measured by a photomultiplier or some other photoelectric device. In this case, the collector electrode comprises a material which emits photons when bombarded by the secondary electrons. A positive voltage may be applied to the collector electrode to attract the secondary electrons which are emitted by the scanning electrode.

Further objects, advantages and features of the present invention will appear from the following description, taken with the accompanying drawings, in which.

Figure 3:
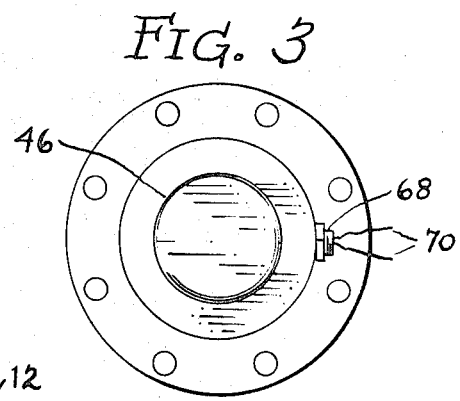
FIG. 3 is a partial plan view, taken generally as indicated by the line 3—3 in FIG. 1.

It will be seen that the drawings illustrate a beam scanner 10, employed in connection with a beam tube or line 12 for a high voltage accelerator or the like, adapted to produce a beam 14 of high energy particles, which may be electrons, protons, deuterons, or negative ions, for example. The beam scanner 10 is applicable to any other device which produces or utilizes such a beam.

The illustrated beam scanner 10 comprises a housing 16 having wall means 18 to form a passage 20 for the beam 14. As illustrated, the wall means 18 take the form of a conductive cylindrical tube, adapted to form a section of the beam line 12. Flanges 22 may be mounted on the ends of the tubular wall 18 for use in connecting the tubular wall between sections of the beam line 12.

The beam scanner 10 comprises a scanning electrode 24 which is movable across the beam 14. Various means may be provided for producing rotary, vibratory or transitory movement of the electrode 24. In this case, the scanning electrode 24 is mounted on a rotor 26 so as to be rotatable therewith. During each revolution of the rotor 26, the scanning electrode 24 moves twice across the beam 14.

As shown, the rotary axis of the rotor 26 is perpendicular to the axis of the beam 14. The scanning electrode 24 may assume various forms but is illustrated as a conductive wire which is mounted on the rotor 26 and is bent into a shape such that the electrode makes an oblique angle with the axis of the beam 14. Due to this construction of the scanning electrode 24, it sweeps across the beam at different angles during its two crossings of the beam for each revolution of the rotor 26. The shape of the electrode 24 is preferably such that the beam is scanned along two perpendicular axes, during the two passes across the beam. This construction of the scanning electrode was suggested by Hortig in his paper, cited above.

When the scanning electrode 24 moves across the beam 14, a portion of the beam current is delivered to the electrode. At the same time, the impingement of the high energy particles upon the scanning electrode 24 produces the emission of secondary electrons from the electrode. In many cases, one or more secondary electrons are emitted from the scanning electrode 24 due to the impingement of each high energy beam particle upon the electrode.

In accordance with the present invention, an accurate indication of the beam current is obtained by collecting and measuring the secondary electrons emitted by the scanning electrode 24. For this purpose, the beam scanner 10 is provided with a collector electrode 28 spaced outwardly from the scanning electrode 24.

In the illustrated construction, the collector electrode 28 extends around the scanning electrode 24 and is generally cylindrical in shape to collect the secondary electrons emitted in various directions by the scanning electrode. It will be seen that the collector electrode 28 is spaced inwardly from the tubular wall 18 and is electrically insulated therefrom by means of a plurality of insulators 30 or by other means. The illustrated insulators 30 are in the form of insulating tubes made of ceramics or some other suitable insulating materials, and fitted snugly between the tubular wall 18 and the collector electrode 28. The rotor 26 includes a shaft 32 which extends through an opening 34 in the collector electrode 28.

It will be understoood that a vacuum is maintained in the housing 16 during the operation of the beam scanner 10. To derive an output signal from the collector electrode 28, an output lead or conductor 36 is brought out of the housing 16 from the collector electrode 28. The output lead 36 is electrically insulated from the conductive wall 18 of the housing 16. In the illustrated construction, a feed-through insulator 38 is employed to bring out the output lead 36. The feed-through insulator 38 is sealed into a suitable opening 40 in the tubular wall 18.

To minimize electrical noise and the pickup of spurious signals, a conductive tubular shield 42 is mounted coaxially around the output lead 36 and is electrically connected to the conductive tubular wall 18. The output lead 36 delivers the output signal to an oscilloscope 44 or some other suitable indicator or utilization device.

It will be understood that the oscilloscope 44 produces traces or patterns which represent the variation in the secondary electron current as the scanning electrode 24 is moved across the beam 14. The trace on the oscilloscope has two portions representing the two passes of the scanning electrode 24 across the beam 14 during each revolution of the rotor 26.

Means are provided to rotate the rotor 26 and the scanning electrode 24, mounted thereon, preferably at a constant angular velocity. Such means may include an electric or other motor 46 having a rotary output shaft 48. A magnetic drive is preferably provided between the motor shaft 48 and the rotor 26 in order to obviate any need for a rotary connecting shaft with vacuum seals.

In the illustrated arrangement, magnets 50 and 52 are mounted on the rotor 26 and are adapted to be driven by magnets 54 and 56 mounted on the motor shaft 48. The two sets of magnets are on opposite sides of a thin partition or wall 58 which closes the vacuum space within the housing 16. The wall 58 is preferably made of a nonmagnetic material. The magnets 54 and 56 rotate with the motor shaft 48 and cause rotation of the magnets 50 and 52, along with the rotor 26, because of the magnetic attraction between the two sets of magnets.

Figure 4:
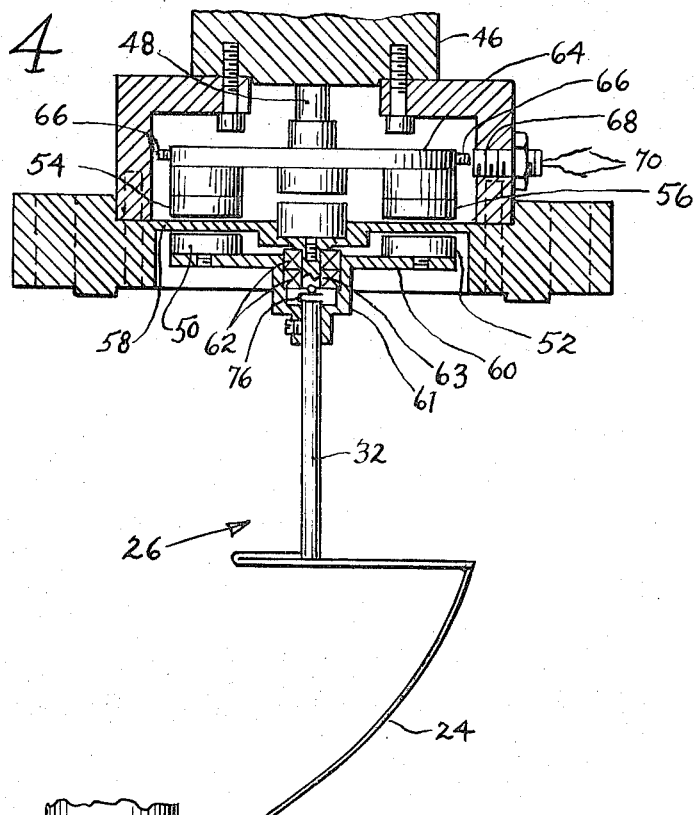
FIG. 4 is a fragmentary enlarged vertical section corresponding to a portion of FIG. 2.

As illustrated, the magnets 50 and 52 are mounted on a member 60 which forms a portion of the rotor 26. The member 60 has a hub 61 to which the rotor shaft 32 is secured. As shown in FIG. 4, the member 60 is rotatably supported by bearings 62 mounted within the hub 61 and around a stationary stub shaft 63 on the wall 58.

As illustrated, the magnets 54 and 56 are mounted on a member 64 secured to the motor shaft 48. The magnets 50, 52, 54 and 56 are preferably in the form of small permanent magnets. Each set of magnets is arranged to present north and south poles to the other set of magnets. The north and south poles are attracted to each other so that the rotor 26 is always driven in the same angular relationship to the member 64 and the motor shaft 48.

The beam scanner 10 is preferably provided with means for synchronizing the oscilloscope 44 with the rotation of the scanning electrode 24. To provide synchronizing signals, one or more magnets are preferably mounted on the member 64. The magnets 66 are adapted to generate pulses in a pickup coil 68, disposed opposite the path of the magnets 66. The coil 68 has output leads 70 adapted to be connected to the synchronizing circuits of the oscilloscope 44. Each of the magnets 66 is preferably in the form of a small permanent magnet mounted on the periphery of the member 64 so as to rotate in synchronism with the scanning electrode 24.

During normal operation of the beam scanner 10, the motor 46 is energized so that the motor shaft 48 and the member 64 are continuously rotated. The magnets 54 and 56 on the member 64 attract the magnets 50 and 52 so as to cause the rotor 26 to rotate in synchronism with the motor shaft 48. The scanning electrode 24 is thereby rotated so that it cuts across the beam 14 twice during each revolution of the rotor.

When the scanning electrode 24 moves across the beam 14, a portion of the beam current is delivered to the scanning electrode. At the same time, secondary electrons are emitted from the scanning electrode 24 due to the bombardment of the electrode by the high energy particles in the beam 14. It is preferred to provide an electrically conductive path between the scanning electrode 24 and the grounded housing wall 18 so that the net current to the scanning electrode 24 is diverted to ground. Such net current represents the combination of the secondary electron current and the portion of the beam current delivered to the scanning electrode.

In this case, a wiping or sliding contactor or brush 76 is provided between the rotor 26 and the stationary shaft 63, both of which are preferably made of conductive materials. The wall 58 is also preferably made of a conductive material and is connected to the housing wall 18. In this way, the scanning electrode 24 is grounded to the wall 18.

Many of the secondary electrons emitted by the scanning electrode 24 are gathered by the collector electrode 28. To increase the secondary electron current to the collector electrode 28, a positive biasing voltage may be applied between the collector electrode and the grounded scanning electrode 24. For this purpose, the positive terminal of a biasing voltage supply 78 may be connected to the output lead 36, preferably through a load resistor or impedance 80. The negative terminal of the biasing voltage supply 78 is preferably connected to the grounded wall 18, to which the scanning electrode 24 is connected, as already described.

The oscilloscope 44 displays the variations of the secondary electron current as the scanning electrode 24 is rotated. When the scanning electrode 24 is moved across the beam 14, the secondary electron current increases in proportion to the beam current intercepted by the scanning electrode. The oscilloscope produces traces which depict the profiles of the beam along two perpendicular axes. It will be understood that other indicating or measuring devices may be employed instead of the oscilloscope 44.

Inasmuch as the output signal of the beam scanner is derived by a direct connection to the stationary collector electrode 28, there is no problem with noise due to sliding contacts. Thus, a stable and reliable output signal is produced.

The magnitude of the output signal can be increased by making the scanning electrode 24 of a material which emits secondary electrons profusely when bombarded by the high energy particles in the beam 14. Thus, for example, the scanning electrode 24 may comprise beryllium or a beryllium alloy, or some other material containing or coated with beryllium. By way of further example, the scanning electrode 24 may be coated with various metallic oxides which emit secondary electrons with high efficiency when bombarded by the high energy particles in the beam 14.

It has been found that the present invention makes it possible to obtain good measurements of the beam profiles, even when the beam current is extremely small, ranging down to about $1 \times 10^{-9}$ ampere. Electrical noise is minimized by the utilization of the stationary collector electrode to collect the secondary electrons.

Figure 1:
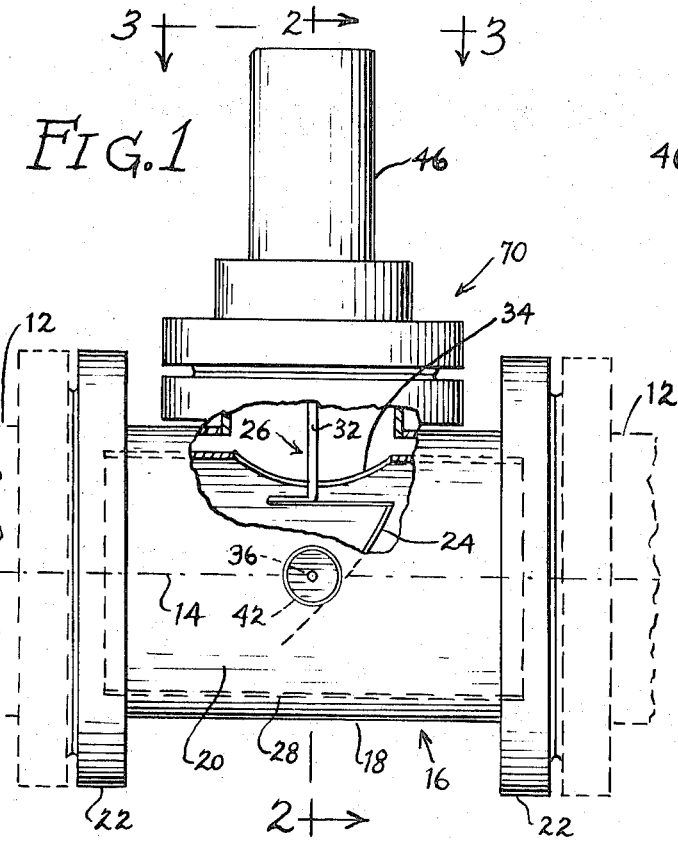
FIG. 1 is a fragmentary elevation of a beam scanner to be described as an illustrative embodiment of the present invention.
Figure 2:
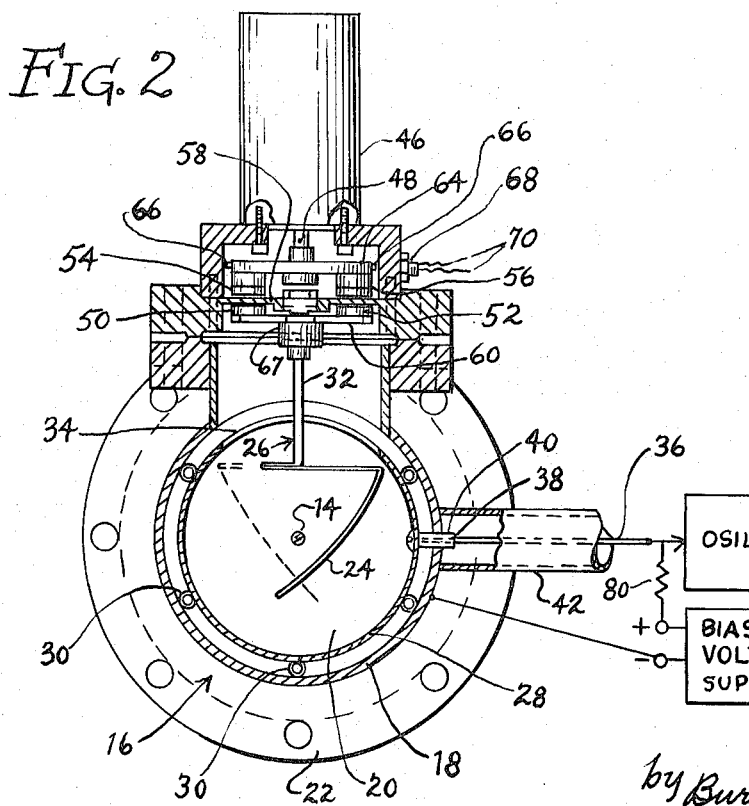
FIG. 2 is a general cross section, taken along the line 2—2 in FIG. 1.
Figure 5:
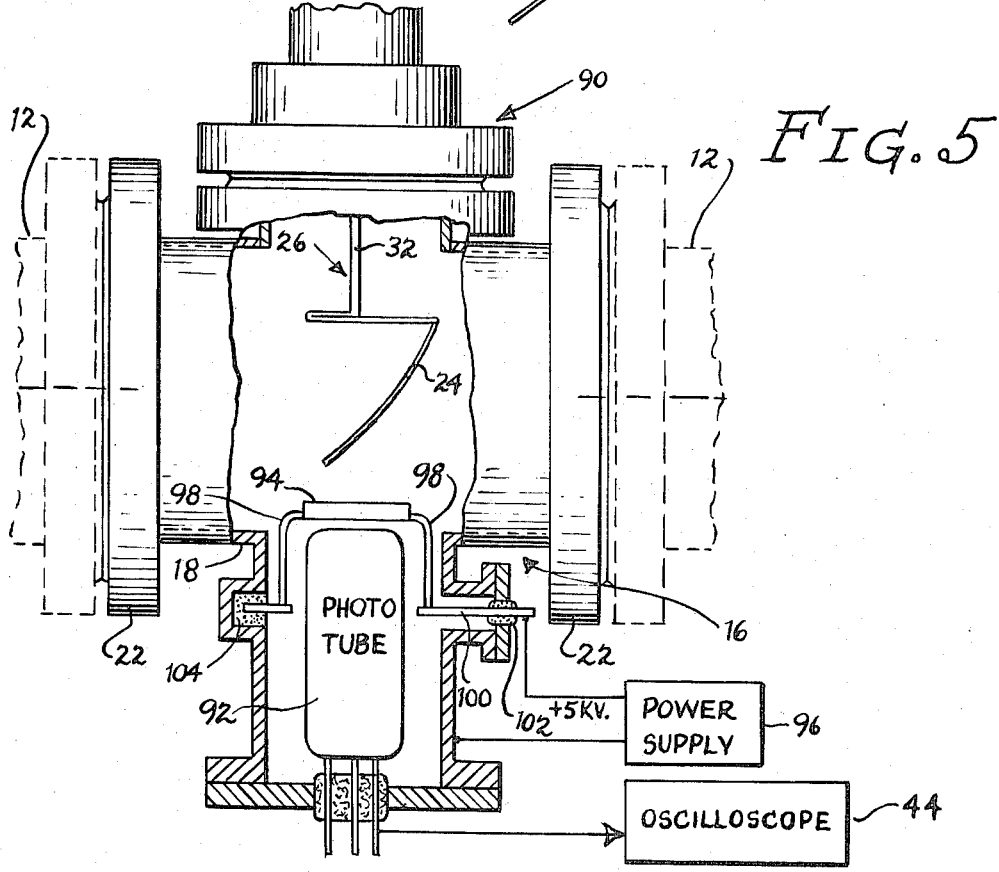
FIG. 5 is a diagrammatic view, similar to FIG. 1 but showing a modified beam scanner in which the secondary electrons produce photons.

FIG. 5 illustrates a modified beam scanner 90 in which the secondary electrons are employed to produce photons, which are detected and measured by a photomultiplier tube 92 or some other photoelectric device. The photomultiplier tube 92 produces considerable amplification so that good beam profile measurements can be made with even smaller beam currents, ranging down below about $1 \times 10^{-11}$ ampere. The secondary electrons, emitted by the scanning electrode 24, are attracted to a collector electrode 94 which replaces the cylindrical collector electrode of FIGS. 1 and 2. The collector electrode 94 contains or is coated with a fluorescent material which scintillates or emits photons when bombarded by the secondary electrons.

In the illustrated construction, the collector electrode 94 is in the form of a scintillator disc or other member disposed adjacent or in front of the photomultiplier tube 92 so that many of the photons emitted by the disc will travel into the tube 92. As a result, the tube 92 will produce an amplified electrical output signal corresponding to the magnitude of the secondary electron current. The photons, being uncharged, can travel without difficulty into the photomultiplier tube 92, even though the first electrode of the tube may be at a high negative potential.

The collector electrode 94 may be made of a transparent or translucent material, such as glass or mica, for example, so as to transmit the photons. A thin conductive coating may be provided on the collector electrode 94 to receive the secondary electrons. Such conductive coating may be made of a transparent or translucent material, such as conductive glass or a metal coating which is so thin as to be translucent. A coating of a fluorescent material may also be applied to the collector electrode 94. Such fluorescent material may be of any known or suitable type which emits photons due to the impingement of electrons. Such photons may include visible light, ultraviolet radiation or any other electromagnetic radiation.

A positive potential is preferably applied to the collector electrode 94, relative to the grounded scanning electrode 24, so that the secondary electrons will be attracted to the collector electrode.

As shown, the positive terminal of a power supply 96 is connected to the collector electrode 94, while the negative terminal of the power supply is connected to the grounded wall 18 of the housing 16. The collector electrode 94 is suitably supported in the vacuum space within the housing 16, preferably by wires 98, one of which is connected to a lead-in conductor 100 brought through the wall of the housing 16 by a feed-through insulator 102. The positive terminal of the power supply 96 is connected to the lead-in conductor 100. An insulating support 104 is provided for the other supporting wire 98. The collector electrode 94 is preferably opposite the scanning electrode 24 so that a maximum number of secondary electrons will be drawn to the collector electrode.

The phototube 92 is shown as being mounted within the housing 16 so that the photons travel directly from the collector electrode 94 to the phototube 92. However, a transparent window may be provided in the wall of the housing 16 to transmit the photons. In that case, the phototube 92 may be located opposite the window and outside the vacuum space in the housing 16.

The positive potential on the collector electrode 94 is indicated in FIG. 5 as 5 kilovolts, but may be at any suitable level. For example, the positive potential may be from 2 to 15 kilovolts.

The conductive coating and the scintillating screen of the collector electrode may be deposited directly upon the transparent envelope of the photomultiplier tube 92, rather than upon a separate disc or other member. Another arrangement is to deposit the scintillating screen upon an inner surface of a transparent window in the wall of the housing 16 so that the photons will be transmitted through the window to the photomultiplier tube or some other photoelectric device outside the window.

Increasing the positive voltage on the collector electrode causes the secondary electrons to hit the scintillating screen with increased energy. In this way, the production of photons by the screen is increased so that the sensitivity of the beam scanner is increased.

A fluorescent or representing material may also be provided on the scanning electrode 24 so that photons will be produced by the impingement of the high energy beam particles upon the scanning electrode. Many of these photons will also travel into the photomultiplier tube 92 so as to produce an amplified output signal representing the profile of the beam.

Various other modifications, alternative constructions and equivalents may be employed, as will be evident to those skilled in the art.

I claim:
1. A beam scanning device,
    comprising conductive wall means forming a passage along which a beam of high energy particles is to be directed,
    a rotor having a scanning electrode thereon disposed in said passage and movable across said beam due to the rotation of said rotor,
    means for electrically connecting said scanning electrode to said conductive wall means,
    a collector electrode disposed in said passage and spaced from said scanning electrode for receiving secondary electrons emitted by said scanning electrode due to the impingement of said beam upon said scanning electrode, means for insulating said collector electrode from said conductive wall means, an output conductor connected to said collector electrode and extending outwardly from said passage and out of said conductive wall means, and means for insulating said output conductor from said conductive wall means.

2. A scanning device according to claim 1, in which said wall means includes a conductive wall extending around the beam and also around the scanning electrode and the collector electrode.

3. A scanning device according to claim 1, in which said collector electrode extends around the beam and also around the scanning electrode.

4. A scanning device according to claim 1,
in which said wall means includes a conductive wall extending around the beam and said scanning electrode,
said collector electrode extending around said scanning electrode.

5. A scanning device according to claim 1,
in which said collector electrode is generally cylindrical and is disposed within said wall means,
said collector electrode extending around said scanning electrode and being spaced outwardly therefrom.

6. A scanning device according to claim 1, in which said last-mentioned means includes a feed-through insulator extending through said wall means to bring said output conductor from said collector electrode and out of said passage.

7. A scanning device according to claim 1,
in which said wall means includes a tubular conductive wall extending around said beam and said scanning electrode,
said collector electrode being mounted within said conductive wall and extending around said scanning electrode,
said means for insulating said output conductor including a feed-through insulator extending through said conductive wall to carry said output conductor from said collector electrode and out of said passage.

8. A scanning device according to claim 1, including means for producing a positive biasing voltage on said collector electrode relative to said conductive wall means.

9. A scanning device according to claim 1, in which said scanning electrode is made of a material which emits secondary electrons with high efficiency when bombarded by high energy particles.

10. A scanning device according to claim 1,
in which said collector electrode includes means for producing photons in response to the impingement of the secondary electrons,
said scanning device including means for detecting and measuring said photons.

11. A beam scanning device,
comprising conductive wall means forming a passage along which a beam of high energy particles is to be directed,
a scanning electrode disposed in said passage and movable across said beam,
driving means for repeatedly moving said scanning electrode across said beam,
means for electrically connecting said scanning electrode to said conductive wall means,
an output electrode disposed in said passage and spaced from said scanning electrode for collecting secondary electrons emitted by said scanning electrode due to the impingement of said beam upon said scanning electrode,
and means for insulating said output electrode from said conductive wall means.

12. A scanning device according to claim 11, in which said wall means includes a conductive wall extending around the beam and also around the scanning electrode and the output electrode.

13. A scanning device according to claim 11, in which said output electrode extends around the beam and also around the scanning electrode.

14. A scanning device according to claim 11,
in which said wall means includes a conductive wall extending around the beam and said scanning electrode,
said output electrode extending around said scanning electrode and also around the beam.

15. A scanning device according to claim 11,
in which said output electrode is generally cylindrical and is disposed within said wall means,
said output electrode extending around said scanning electrode and being spaced outwardly therefrom.

16. A scanning device according to claim 11,
in which said wall means includes a tubular conductive wall extending around said beam and said scanning electrode,
said output electrode being mounted within said conductive wall and extending around said scanning electrode.

17. A beam scanning device according to claim 11, said means for electrically connecting said scanning electrode to said conductive wall means including sliding contact means.

18. A scanning device according to claim 11,
in which said output electrode includes means for producing photons in response to the impingement of the secondary electrons,
said scanning device including means for receiving and measuring the photons.

19. A scanning device according to claim 11,
in which said output electrode includes scintillating means for producing photons in response to the impingement of the secondary electrons,
and a photoelectric device for receiving and measuring said photons.

20. A scanning device according to claim 19, in which said photoelectric device comprises a photomultiplier.

21. A scanning device according to claim 11,
in which said output electrode includes scintillating means for producing photons in response to the impingement of the secondary electrons,
said scanning device including means for producing a positive potential on said output electrode relative to said scanning electrode,
and means for receiving and measuring the photons from said scintillating means.

22. A beam scanning device, comprising conductive wall means forming a passage along which a beam of high energy particles is to be directed, a rotor having a scanning electrode thereon disposed in said passage and movable across said beam due to the rotation of said rotor, motor means for rotating said rotor, means for electrically connecting said scanning electrode to said conductive wall means, a collector electrode disposed in said passage and extending around said beam and also around said scanning electrode in outwardly spaced relation thereto for collecting secondary electrons emitted by said scanning electrode due to the impingement of said beam upon said scanning electrode, means for electrically insulating said collector electrode from said conductive wall means, and means for providing an electrical output circuit between said collector electrode and said conductive wall means for indicating the secondary electron current collected by said collector electrode.

23. A beam scanning device according to claim 22, including means for producing a positive biasing voltage upon said collector electrode relative to said conductive wall means to attract the secondary electrons to said collector electrode.

* * * * *